United States Patent Office 3,640,931
Patented Feb. 8, 1972

3,640,931
CROSS-LINKABLE DERIVATIVES OF AN ADDITION POLYMER IN A SUBSTANTIALLY NON-POLAR ORGANIC LIQUID
Michael Raymond Clarke, Frankston, Victoria, and Leon Filipowicz, East St. Kilda, Victoria, Australia, assignors to Balm Paints Limited, Melbourne, Victoria, Australia
No Drawing. Filed Oct. 15, 1968, Ser. No. 767,825
Claims priority, application Australia, Oct. 27, 1967, 29,086/67
Int. Cl. C08f *47/18*
U.S. Cl. 260—23 EM            14 Claims

ABSTRACT OF THE DISCLOSURE

A process of preparing a stable dispersion of a cross-linkable derivative of an addition polymer in a substantially non-polar organic liquid. A dispersion of a suitably chemically reactive addition polymer is first prepared in the liquid and then an unsaturated derivative formed. The derivative is cross-linkable by an autoxidative or free radical initiated mechanism or both.

---

This invention relates to a process of preparing dispersions of cross-linkable polymer particles in organic liquids and to polymers prepared by such processes.

It is known that certain addition polymers, e.g. vinyl or (meth)acrylate ester polymers, have excellent film-forming properties when used, for example, in surface coating materials and that for some applications it is advantageous if the polymers form very high molecular weight polymeric films. It has been proposed to combine the excellent film-forming properties of addition polymers with the ability to form therefrom films of very high molecular weight polymers by preparing derivatives of addition polymers wherein modifying entities introduced into the addition polymer chains permit cross-linking of the chains during or after film formation, thus further increasing their molecular weight. For example a solution of a hydroxylated addition polymer may be esterified with drying oil fatty acids to produce a polymeric derivative from which a coating film is formed by evaporation in air of the solvent and autoxidative cross-linking of the fatty acid chains.

However, certain limitations are inherent in such processes. For example a solution of a suitably high molecular weight addition polymer derivative at an acceptable total solids content may produe high-viscosity, intractable solutions. Preparation of the derivative may itself be difficult or impractical due to the high viscosity of the unmodified addition polymer or its solutions at a useful solids concentration.

We have now found that these limitations may be removed by preparing cross-linkable derivatives of high molecular weight addition polymers as stable dispersions of polymer particles in an organic liquid in which the disperse polymer is insoluble, when the preparation is carried out in the particular manner described hereinunder.

According to the present invention we provide a process of preparing a stable dispersion of particles of cross-linkable derivative of an addition polymer in a substantially non-polar organic liquid in which the derivative is insoluble, by the steps of:

(1) Preparing by dispersion polymerization of $\alpha,\beta$-ethylenically unsaturated monomer in an inert organic liquid and in the presence of a stabilizer as herein defined a dispersion of an insoluble polymer having a molecular weight of greater than 50,000 preferably greater than 100,000 and containing on average at least one chemically reactive group per polymer molecule and (2) Reacting with disperse polymer so-prepared at least one unsaturated component bearing a complementary chemically reactive group each said unsaturated component being additionally an autoxidative component or a component which will enter into free radical initiated addition reactions.

The addition polymer derivative may comprise at least one autoxidative component and at least one component which will enter into free radical initiated addition reactions.

We further provide a stable dispersion of particles of a cross-linkable derivative of an addition polymer having a molecular weight of greater than 50,000 and preferably greater than 100,000 in a substantially non-polar organic liquid in which the derivative is insoluble the said derivative being cross-linkable by an autoxidative or free radical initiated addition reaction.

The disperse addition polymer derivative may be cross-linkable by both autoxidation and free radical initiated addition polymerization.

The cross-linkable derivative may be separated from the dispersion as solid particles and accordingly we also provide as a particulate solid, a cross-linkable derivative of an addition polymer having a molecular weight of greater than 50,000 and preferably greater than 100,000 the said derivative being insoluble in substantially non-polar organic liquids and cross-linkable by an autoxidative or free radical initiated addition reaction.

In one particular embodiment of the invention the particulate solids are cross-linkable by both autoxidation and free radical initiated addition polymerization.

By "dispersion polymerization" we mean a process of polymerizing monomer in an inert organic liquid in which the monomer is soluble and the resulting polymer is insoluble and forms disperse particles, the organic liquid containing a stabilizer for the disperse polymer particles comprising an anchoring component which becomes associated with the particles and a pendent chain-like component which is solvated by the organic liquid and provides a stabilizing sheath around the polymer particles. The liquid is inert with respect to the polymerization reaction. For the purpose of this invention the dispersion must be a very stable one, which we achieve by the use of stabilizers of high anchoring energy.

The preferred stabilizer may be a selected stabilizer of the type described in co-pending U.S. application Ser. No. 525,315 filed Feb. 7, 1966, now abandoned, in which the association is the result of interaction between acidic and basic groups in the stabilizer and disperse polymer, such interaction including hydrogen bonding, or between fixed dipoles in the stabilizer and complementary fixed or induced dipoles in the disperse polymer, the basis of selection being as follows:

In general, stabilizers as described in the above copending application in which the interaction between the stabilizer and the disperse polymer is an interaction between strong acids and strong bases, e.g. between carboxyl and amine groups, are satisfactory. However the invention is not limited to the use of this embodiment of the above application alone and we prefer to select suitable combinations of disperse polymer and stabilizer by the following practical test:

A stable dispersion of 50% by weight solids content of the desired polymer is prepared in the chosen inert organic liquid and stabilized by a stabilizer as described in the above co-pending application. To 132 parts by weight of the above dispersion are added with stirring over a period of 5 minutes, 90 parts by weight of a mixture of equal parts by weight of n-butyl benzyl phthalate, 2-ethoxy ethanol acetate and an aliphatic hydrocarbon. The dispersion so-treated is then stored in an oven at 45° C. If the dispersion remains stable for 48 hours at this temperature, the stabilizer is a satisfactory one for use, in the polymer/organic liquid system tested, according to this invention. If the dispersion gels or coagulates in less than 48 hours under the conditions of this test, the stabilizer is rejected as providing an insufficiently high anchoring energy in the polymer/organic liquid system tested, for the performance of the invention.

Alternatively the stabilizer may be a polymeric stabilizer as described in co-pending U.S. application of Clarke, Ser. No. 740,469 filed June 27, 1968, in which the stabilizer associates with the disperse polymer particles and provides around the said particles a stabilizing steric barrier and characterized in that additionally the stabilizer is co-reacted with the disperse polymer to provide from 1 to 10, preferably from 1 to 4 covalent links per co-reacted stabilizer molecule with the disperse polymer.

Stabilizers having these properties are referred to throughout this specification as stabilizers as herein defined.

The reaction between the disperse polymer and the unsaturated component will generally be an addition reaction and suitable pairs of complementary chemically reactive groups include, for example:

Acid anhydride group with—hydroxyl group
    amine group
    mercaptan group
Epoxide group with—acid group
    secondary amine group
Isocyanate group with—hydroxyl group
    amine group
Hemiformal group with—amide group
Carbonate group with—amine group
N-carbamyl cycloimide group with—amine group
    hydroxyl group The general conditions under which addition reactions take place between such pairs of groups are well known and it will be understood that the temperatures at which these reactions take place depend on the pairs of reactive groups selected and may also be modified by the use of catalysts. For example, the following are some typical suitable reaction conditions:

| Pairs of co-reactive group | Catalyst | Temperature, ° C. |
|---|---|---|
| Acid anhydride: hydroxyl | Triethylamine or N-dimethyl aniline. | 80–125 |
| Acid anhydride: amine | Nil | 20–125 |
| Epoxide: acid | Triethylamine | 80–125 |
| Epoxide: secondary amine | Nil | 20–100 |
| Isocyanate: alcohol hydroxyl | Stannous chloride or zinc chloride. | 30–125 |
| Isocyanate: amine | Nil | 20–100 |
| Carbonate: amine | Nil | (¹) |
| N-carbamyl cycloimide: hydroxyl | Zinc chloride | 50–130 |
| N-carbamyl cycloimide: amine | Nil | 30–100 |

¹ Room temperature.

By substantially non-polar liquid we mean a liquid of essential hydrocarbon character, either aliphatic or aromatic or a mixture of both, optionally containing a minor proportion, for example less than 30% by weight, of an ester, ketone or alcohol.

Addition polymers sufficiently insoluble in such a non-polar liquid to be prepared therein by dispersion polymerization are derivable from, as monomers or co-monomers, one or more mono- α,β-ethylenically unsaturated monomers, e.g. vinyl chloride, vinyl acetate, vinylidene chloride, lower alkyl (meth)acrylate esters, lower di-esters of maleic acid (anhydride) or itaconic acid, styrene, α-methyl styrene and the commercial mixed methyl styrene isomers known as vinyl toluene.

The general requirement is that the addition polymer produced should be sufficiently polar relative to the liquid or sufficiently self-associated or crystalline in structure to be insoluble in the liquid.

The chemically reactive group may be provided in the addition polymer by the use, in the dispersion polymerization, of an α,β-ethylenically unsaturated monomer containing such a group. The addition polymer may be a homopolymer of such a monomer but usually it will be a copolymer derived from such a monomer containing the chemically reactive group and co-monomer not containing such a group, the monomer usually being copolymerized in a minor proportion. The number of chemically reactive groups in the addition polymer is not critical, the only requirement being that a sufficient number of such groups must be available in the polymer to react with the selected number of co-reacting groups borne by the unsaturated components. An excess of chemically reactive groups over the stoichiometric proportion required for the co-reaction may be present in the addition polymer.

Suitable monomers providing reactive groups include, for example, maleic anhydride (acid) and itaconic acid, acid esters of maleic and itaconic acid, glycidyl (meth)-acrylate, hydroxyalkyl (meth)acrylate, acrylamide, methacrylamide, dimethyl aminoethyl methacrylate, vinylidene carbonate and N-carbamyl maleimide.

Each unsaturated component comprises either an autoxidative entity or an entity containing a double bond joining adjacent carbon atoms which is able to enter into an addition reaction with other similarly unsaturated materials in the presence of a free radical initiator, for example an organic peroxide or bis-azonitrile, e.g. benzoyl peroxide or azodiisobutyronitrile. Additionally it must provide a single complementary chemically reactive group, e.g. a carboxyl or epoxide group covalently linked thereto, for co-reaction with a chemically reactive group of the addition polymer.

The autoxidative component may comprise a chain-like or cyclic entity which is known to undergo an oxidative reaction in the presence of oxygen, optionally accelerated by the addition of an autoxidation catalyst.

Suitable chain-like entities are unsaturated paraffinic chains derived from natural drying oils, e.g. tall oil, soya bean oil, safflower oil and linseed oil, although synthetic unsaturated chain-like components of a similar nature may be used. Less preferred chain-like entities are those derived from the conjugated paraffinic chains of tung oil, oiticica oil and dehydrated castor oil.

Thus suitable unsaturated components are for example the mono-alcohols and monobasic carboxylic acids of the above chain-like entities. Alternatively primary amines of the above entities or secondary amines in which two such entities are attached to the same nitrogen atom may be used.

The autoxidative entities may be cyclic. For example they may be vinyl dioxolanes or dioxanes derived from unsaturated aldehydes and polyols or their glycidyl derivatives, e.g. 5-methylol-5-methyl-2-vinyl-1, 3-dioxane, 2-vinyl-4-(buton-1-ol)-1,3-dioxolane or 2(4-methyl vinyl)-4-(buton-1-ol)-1, 3-dioxolane. Attached to this autoxidative entity is a complementary chemically reactive group which does not interfere with the chemical stability of the autoxidative entity.

In its simplest form, an unsaturated component containing a double bond which is able to enter into a subsequent addition reaction in the presence of a source of free radicals would be a substituted ethylene comprising the ethylenic double bond and a complementary chemically reactive group. For example suitable unsaturated components are acrylic acid, methacrylic acid, glycidyl methacrylate and glycidyl acrylate.

The unsaturated component need not, however, be an α,β-ethylenically unsaturated material and other suitable components are provided by, for example, allyl alcohol, glycerol mono- and di-allyl ether, and cinnamic acid.

The unsaturated component may, especially when it is a commercial product, contain a minor proportion, e.g. 2–5% of unsaturated entities which bear more than one complementary reactive group. For example it is known that commercial grades of drying oil fatty acids can contain several percent of dimer acids, that is fatty acids in which two carboxylic acid groups are present in each fatty acid molecule.

This invention is not limited to the exclusion of the use of such materials although due regard must be paid to their presence as difunctional materials in modifying the physical properties of the polymer derivative.

The derivatives of this invention are prepared by first preparing a dispersion of the addition polymer in an inert organic liquid in the presence of the stabilizer, optionally forming at least one covalent link per co-reacted stabilizer molecule between the stabilizer and the disperse polymer, either concurrently with or subsequent to the polymerization reaction.

Suitable liquids in which to carry out the dispersion polymerization and the subsequent reaction with the unsaturated component bearing a complementary reactive group are, for example:

aliphatic hydrocarbons such as pentane, hexane, heptane, and octane;
aromatic hydrocarbons such as xylene and xylene mixtures, benzene, toluene and other alkyl benzenes and solvent naphthas;
commercially available hydrocarbon mixtures such as white spirits.

The liquid may contain a minor proportion of ester, ketone or alcohol, e.g. 2-ethoxy ethyl acetate, methyl isobutyl ketone or cetyl alcohol, and still retain its substantially non-polar character.

The chain-like solvated components of the stabilizer are related to the nature of the inert organic liquid and the stabilizer to be used in the dispersion polymerization must contain a chain-like component solvated by such a liquid. Examples of such components are:

polymers of long-chain esters of acrylic or methacrylic acid, e.g. stearyl, lauryl, octyl, 2-ethyl hexyl and hexyl esters of (meth)acrylic acid;
polymers of vinyl alkyl esters of long-chain acids, e.g. vinyl stearate;
polymers of vinyl alkyl ethers;
polymers of ethylene, propylene, butadiene and isoprene;
long-chain fatty acids and self-esters of hydroxy fatty acids, e.g. self-esters of 12-hydroxy stearic acid;
aromatic polyesters, e.g. oil-modified alkyd resins;
aromatic polyethers and polycarbonates and polymers of styrene and vinyl toluene.

By polymers we mean polymeric products which may contain as few as three or four, but usually contain ten or more, repeating monomeric units per molecule.

In general, conventional polymerization initiators, chain transfer agents, etc. may be used in the dispersion polymerization process, provided they do not react with the reactive group which must be subsequently reacted with the unsaturated component and a detailed description of the dispersion polymerization process is given in the above-mentioned co-pending applications.

Co-reaction of the chemically reactive group of the addition polymer with the complementary reactive group borne by the unsaturated component is carried out by adding the unsaturated component to a dispersion of the addition polymer in the inert organic liquid, and where appropriate adding catalyst, and allowing the pairs of reactive groups to react at the chosen temperature until substantially all of the complementary reactive groups have reacted. Preferably the co-reaction is carried out in an inert atmosphere.

The number of unsaturated components to be co-reacted with each addition polymer molecule will depend on the degree of cross-linking required in the derivative, which in turn depends on the end use to which the polymer is to be put. On average, each polymer molecule must contain at least one unsaturated component. We prefer, however, that when the unsaturated component comprises a chain-like autoxidative entity of more than eight C—C links, the derivative should comprise a maximum 20% by weight of the chain-like entity in order to maintain a dispersion of high stability. The maximum weight of unsaturated component will, for most application, be of the order of 10% of the total weight of polymer.

The dispersions of this invention are particularly useful as film-forming components of surface coatings. For example a dispersion of an autoxidative derivative, e.g. an autoxidative fatty acid derivative, of a poly(methyl methacrylate/glycidyl methacrylate), optionally with the addition of a minor proportion of a coalescing agent, when applied as a film to a substrate will coalesce on evaporation of the organic liquid in air to provide a hard coating, cross-linked by autoxidation of the fatty acid chains.

Alternatively, if a dispersion of an unsaturated acid, e.g. methacrylic acid, derivative of the above addition polymer is mixed with benzoyl peroxide and optionally with methyl methacrylate monomer a similar hard coating may be formed on a substrate, cross-linked by an addition reaction of the unsaturated group of the methacrylic acid entity. By selection of the optional $\alpha,\beta$-ethylenically unsaturated monomer and the concentration of that monomer, both the length and flexibility of the cross-links may be varied.

For example if styrene is used as the optional monomer the cross-links will be rigid whereas relatively flexible cross-links are provided by for example 2-ethyl hexyl acrylate, dibutyl maleate and lauryl methacrylate. Combinations of monomers of each type in varying proportions may also be used to provide cross-links of intermediate flexibility.

It will be understood that according to the reaction conditions and the reactivity ratios of the co-reactants that some degree of grafting of branch chains of polymerized monomer may take place in addition to the cross-linking reaction and under certain reaction conditions a major proportion of the optional monomer may be so-present in the cured, cross-linked derivative.

Again, if a dispersion of a derivative of the above addition polymer is prepared in which both autoxidative fatty chains and methacrylic acid entities are present, optionally with the inclusion of an autoxidation catalyst and an $\alpha,\beta$-ethylenically unsaturated monomer, a cross-linked polymer may be formed in which the cross-links result partially from autoxidation of the autoxidative chains and partially by an addition reaction initiated by free radicals generated by the autoxidation process.

When polymer dispersions are prepared according to this invention, provided the disperse polymer contains a sufficient number of chemically reactive groups, the physical properties of the derivative may also be conveniently modified by an addition reaction between the said groups and materials containing two complementary chemically reactive groups. The complementary groups and reaction conditions to be used are similar to those described with reference to the preparation of the addition polymer derivative.

It will be apparent, however, that due regard must be paid to the general principles of polymer chemistry to ensure that the unsaturated component of the derivative is not hindered and prevented from taking part in a subsequent cross-linking reaction by any such additional modification.

The modification may be carried out on suitable addition polymers before preparation of their cross-linkable derivatives or on the derivatives themselves and is a useful method of increasing the molecular weight of the disperse polymer derivative to, for example, increase the durability, hardness and resistance to solvation by highly polar liquids of coating films formed therefrom.

The disperse particles of derivative may be separated as a particulate solid from the dispersion by suitable mechanical means. For example the organic liquid may be removed by evaporation below the softening point of the particles, optionally under reduced pressure, or by flash-drying.

Because the stabilizer remains associated with the dried solid particles, the particles may be stably re-dispersed in an organic liquid of the type used in preparing the dispersion. When the stabilizer comprises a stabilizer as herein described and in addition meets the requirements of a stabilizer which provides one or more components which in the presence of a hydrophilic liquid are solvated by the liquid and are present in the stabilizer in a proportion of 25% or more of the total weight of stabilizer, the particulate solid will additionally be re-dispersible in hydrophilic liquids.

The invention is illustrated by the following examples, in which all parts are by weight.

EXAMPLE 1

Preparation of a dispersion of a cross-linkable derivative of a poly(methyl methacrylate/maleic anhydride) of monomer ratio 71/29. The modified disperse polymer provided unsaturated groups capable of taking part in a free radical initiated cross-linking reaction.

Stabilizer preparation

A self polyester of 12-hydroxy stearic acid of molecular weight about 1700 condensed with glycidyl methacrylate to introduce a polymerizable bond (hereinafter referred to as monomer A) was copolymerized with methyl methacrylate and methacrylic acid in the ratio by weight of 50:46:4 in the presence of butyl acetate and ethyl acetate in the weight proportion 1:2.

A 50% solution of a polymeric stabilizer of molecular weight about 30,000 was formed (stabilizer solution A).

Dispersion preparation

A mixture of:

| | Parts |
|---|---|
| Stabilizer solution A (above) | 1.84 |
| Aliphatic hydrocarbon (boiling range 140°–205° C., aromatics content 17%) | 70.4 |
| Aliphatic hydrocarbon (boiling range 160°–177° C., no aromatics) | 136.0 |
| Aliphatic hydrocarbon (boiling range 40°–60° C., no aromatics) | 83.3 |
| Methyl methacrylate | 8.45 |
| Maleic anhydride | 3.72 |
| N,N-dimethyl formamide | 10.0 |
| Azodiisobutyronitrile | 1.0 | was added to a reaction vessel fitted with a reflux condenser heated to reflux and held at reflux for 20 minutes. A very fine cloud of disperse polymer formed.

The following mixtures:

| | Parts |
|---|---|
| (1) Stabilizer solution A (above) | 46.0 |
| Methyl methacrylate | 189.5 |
| Maleic anhydride | 81.5 |
| n-Butyl acetate | 35.0 |
| N,N-dimethyl formamide | 10.5 |
| n-Octyl mercaptan (10% solution in aliphatic hydrocarbon) | 3.33 |
| (2) Methyl methacrylate | 23.25 |
| Azodiisobutyronitrile | 1.5 | were added separately and concurrently at a uniform rate over a period of three hours to the refluxing contents of the reaction vessel in such a manner that the mixture feed was well diluted by the reflux return. Refluxing was continued for a further 30 minutes. A stable 50% solids dispersion of an addition copolymer of methyl methacrylate and maleic anhydride with a molecular weight of approximately 120,000 was obtained.

Derivative preparation 800.0 parts of the above polymer dispersion was placed in a reaction vessel fitted with a mechanical stirrer and reflux condenser and heated to 105° C. The reaction vessel was purged with oxygen free nitrogen, the flow of nitrogen being continued throughout the entire reaction period.

The following mixture:

| | Parts |
|---|---|
| Aliphatic hydrocarbon (boiling range 140°–205° C., aromatics content 17%) | 130 |
| β-Hydroxy ethyl methacrylate | 142.0 |
| Ethylene glycol diacetate | 30 |
| Hydroquinone | 0.4 | was heated to 90° C. and added to the hot polymer dispersion. The temperature was increased to 115° C. and maintained for six hours. A stable dispersion of polymer derivative was formed.

Cure test

To 1400 parts of the above polymer dispersion heated to reflux in a reaction vessel (80° C.) was added with the reflux return 250 parts of aromatics free hydrocarbon of boiling range 37–52° C. and 300 parts of aromatics free hydrocarbon of boiling range 114–140° C. In the same manner, 120 parts of ethylene glycol diacetate, 150 parts of butylene glycol diacetate and 240 parts of n-butyl benzyl phthalate. The dispersion so-plasticized was cooled to room temperature and the following mixture:

| | Parts |
|---|---|
| Ethylene glycol dimethacrylate | 70 |
| Methyl ethyl ketone peroxide | 3 |
| 10% cobalt octoate solution in toluene | 0.1 |
| Aliphthatic hydrocarbon (boiling range 114–140° C.) | 210 | added with constant stirring to provide a cure test dispersion.

A film of the above dispersion of about 1.5 thickness was cast on a glass plate, air dried at ambient room temperature until touch-dry and then force dried for three hours at 60° C.

A similar control film was prepared but omitting the free radical initiator from the cure test dispersion.

Drops of acetone were then applied to each film. The control film dissolved within a few minutes, while the film from the initiated dispersion showed only slight swelling under the acetone, thereby demonstrating the superior degree of cure of the dispersion of the invention in the presence of polymerizable monomer and free radical polymerization initiator.

EXAMPLE 2

Preparation of a dispersion of a cross-linkable derivative of a poly(methyl methacrylate/maleic anhydride) of monomer ratio 71/29. The disperse polymer provides autoxidative groups which are capable of taking part in a cross-linking autoxidation reaction.

800.0 parts of the addition copolymer polymer dispersion of Example 1 was placed in a reaction vessel fitted with a mechanical stirrer and reflux condenser and heated to 105° C. The reaction vessel was purged with oxygen free nitrogen, the flow of nitrogen being continued throughout the entire reaction period.

The following mixture:

| | Parts |
|---|---|
| Ethylene glycol mono allyl ether | 112.7 |
| Ethylene glycol diacetate | 31.0 |
| Aliphatic hydrocarbon (boiling range 140°–205° C. aromatics content 17%) | 130.0 |
| Hydroquinone | 0.4 | was heated to 90° C. and added to the hot polymer dispersion. The temperature was increased to 115° C. and maintained for a further six hours. A stable dispersion of polymer derivative was found.

EXAMPLE 3

Preparation of a dispersion of a cross-linkable derivative of a poly(vinyl acetate/maleic anhydride), monomer ratio 80/20. The disperse polymer provided unsaturated linkages and autoxidative groups capable of taking part in both autoxidation and free radical initiated cross-linking reactions.

Dispersion preparation

A mixture of:

| | Parts |
|---|---|
| Stabilizer solution A (from Example 1) | 1.84 |
| Aliphatic hydrocarbon (boiling range 140°–205° C. aromatics content 17%) | 70.4 |
| Aliphatic hydrocarbon (boiling range 160°–177° C. no aromatics) | 136.0 |
| Aliphatic hydrocarbon (boiling range 40–60° C., no aromatics) | 83.0 |
| Vinyl acetate | 8.6 |
| Maleic anhydride | 2.0 |
| N,N-dimethyl formamide | 10.0 |
| Azodiisobutyronitrile | 1.0 | was added to a reaction vessel fitted with a reflux condenser and mechanical stirrer, heated to reflux and held at reflux for 20 minutes if very fine cloud of disperse polymer formed.

The following mixtures:

| | Parts |
|---|---|
| Stabilizer solution A (from Example 1) | 46.0 |
| Vinyl acetate | 162.0 |
| Maleic anhydride | 47.3 |
| n-Butyl acetate | 35.0 |
| N,N-dimethyl formamide | 10.5 |
| Primary octyl mercaptan (10% solution in aliphatic hydrocarbon) | 3.3 |
| Vinyl acetate | 22.5 |
| Azodiisobutyronitrile | 1.5 | were added separately and concurrently at a uniform rate over a period of three hours to the refluxing contents of the reaction vessel in such a manner that the mixture feed was well diluted by the reflux return. Refluxing was continued for a further 30 minutes. A stable 43% solids dispersion of a copolymer of vinyl acetate and maleic anhydride with a molecular weight of approximately 120,000 was obtained.

Derivative preparation 800.0 parts of the above polymer dispersion was placed in a reaction vessel fitted with a mechanical stirrer and reflux condenser and heated to 105° C. The reaction vessel was purged with oxygen free nitrogen, the flow of nitrogen being continued throughout the entire reaction period.

The following mixture:

| | Parts |
|---|---|
| β-Hydroxy ethyl acrylate | 40.08 |
| Ethylene glycol mono-allyl ether | 32.3 |
| Ethylene glycol di-acetate | 40.0 |
| Aliphatic hydrocarbon (boiling range 140°–205° C. aromatics content 17%) | 140.0 | was heated to 90° C. and added to the hot polymer dispersion. The temperature was increased to 115° C. and maintained for six hours. A stable dispersion of polymer derivative was formed.

Cure test 1400 parts of the dispersion was plastized as described in the cure test of Example 1 and then mixed with 70 parts of ethylene glycol dimethacrylate, 37 parts of a 10% solution of cobalt octoate in xylene and 210 parts of an aliphatic hydrocarbon of boiling range 114–140° C.

A film of about 1.5 mil. thickness of the dispersion was cast on a glass plate and allowed to air-dry at ambient room temperature. For comparison a film of a second sample of the dispersion treated as above but omitting the cobalt octoate autoxidation catalyst was also prepared.

After 24 hours and three days the cobalt octate free films dissolved readily when spotted with acetone, whereas the catalyzed showed only slight swelling. The hardness of the catalyzed film was attributed to autoxidative crosslinking of the disperse polymer and to addition copolymerisation with the polymerizable monomer initiated by free radicals generated by the autoxidation process.

EXAMPLE 4

Preparation of a dispersion of a cross-linkable derivative of a poly(methyl methacrylate/glycidyl methacrylate), monomer ratio 70/30. The disperse polymer provided unsaturated linkages capable of taking part in a free radical initiated cross-linking reaction.

Stabilizer preparation

By the general method of Example 1 a solution of a stabilizer was prepared from Monomer A, methyl methacrylate and glycidyl methacrylate in the weight proportion of 48/48/4. This solution will be referred to as stabilizer solution B.

Dispersion preparation

A mixture of:

| | Parts |
|---|---|
| Stabilizer solution B (as above) | 8.0 |
| Aliphatic hydrocarbon (boiling range 140°–205° C., aromatics content 17%) | 412.0 |
| Aliphatic hydrocarbon (boiling range 160°–177° C., no aromatics) | 200.0 |
| Aliphatic hydrocarbon (boiling range 40°–60° C., no aromatics) | 270.0 |
| Methyl methacrylate | 22.7 |
| Glycidyl methacrylate | 9.7 |
| Azodiisobutyronitrile | 3.0 | was added to a reaction vessel fitted with a reflux condenser, heated to reflux and held at reflux for 20 minutes. A very fine cloud of disperse polymer formed.

The following mixture:

| | Parts |
|---|---|
| Stabilizer solution B (as above) | 138.0 |
| Methyl methacrylate | 490.0 |
| Glycidyl methacrylate | 210.0 |
| Azodiisobutyronitrile | 3.0 |
| Primary octyl mercaptan (10% solution in aliphatic hydrocarbon) | 10.0 | was added at a uniform rate over a period of three hours to the refluxing contents of the reaction vessel in such a manner that the mixture feed was well diluted by the reflux return. Refluxing was continued for a further 30 minutes. A stable 49% solids dispersion of methyl methacrylate and glycidyl methacrylate copolymer of molecular weight approximately 100,000 was obtained.

Derivative preparation 800.0 parts of the above polymer dispersion were placed in a reaction vessel fitted with a mechanical stirrer and reflux condenser and heated to 105° C. The reaction vessel was purged with oxygen free nitrogen, the flow of nitrogen being continued throughout the entire reaction period.

The following mixture:

| | Parts |
|---|---|
| Methacrylic acid | 72.7 |
| Hydroquinone | 0.1 | was heated to 90° C. and added to the hot polymer dispersion. The temperature was increased to 115° C. and maintained for six hours. A stable dispersion of polymer derivative was formed.

EXAMPLE 5

Preparation of a dispersion of a cross-linkable derivative of a poly(methyl methacrylate/glycidyl methacrylate), monomer ratio 70/30. The disperse polymer provided unsaturated linkages and autoxidate groups capable of taking part in both free radical initiated and autoxidation cross-linking reactions.

Stabilizer preparation

Monomer A of Example 1 was copolymerized with methyl methacrylate and glycidyl methacrylate in the ratio by weight of 50:46:4 in the presence of n-butyl acetate and ethyl acetate in the weight proportion of 1:2. A 50% solution of a polymeric stabilizer of molecular weight about 30,000 was formed. The stabilizer so-produced was then modified to introduce therein polymerizable double bonds in the following manner.

The following mixture:

| | Parts |
|---|---|
| Stabilizer solution (above) | 200 |
| n-Butyl acetate | 112 |
| Methacrylic acid | 1 |
| Hydroquinone | 0.02 |
| Coconut fatty acid tertiary amine | 0.10 | was heated to reflux (approximately 110° C.) in a reaction vessel fitted with a reflux condenser and held at reflux for five hours. The solution of stabilizer so-formed will be referred to as stabilizer solution B.

Dispersion preparation

A mixture of:

| | Parts |
|---|---|
| Stabilizer solution B (as above) | 8.0 |
| Aliphatic hydrocarbon (boiling range 140°–205° C., aromatics content 17%) | 412.0 |
| Aliphatic hydrocarbon (boiling range 160°–177° C., no aromatics) | 200.0 |
| Aliphatic hydrocarbon (boiling range 40°–60° C., no aromatics) | 270.0 |
| Methyl methacrylate | 22.7 |
| Glycidyl methacrylate | 9.7 |
| Azodiisobutyronitrile | 3.0 | was added to a reaction vessel fitted with reflux condenser, heated to reflux and held at reflux for 20 minutes. A very fine cloud of disperse polymer formed.

The following mixture:

| | Parts |
|---|---|
| Stabilizer solution B (above) | 138.0 |
| Methyl methacrylate | 490.0 |
| Glycidyl methacrylate | 210.0 |
| Azodiisobutyronitrile | 3.0 |
| Primary octyl mercaptan (10% solution in aliphatic hydrocarbon) | 10.0 | was added at a uniform rate over a period of three hours to the refluxing contents of the reaction vessel in such a manner that the mixture feed was well diluted by the reflux return. Refluxing was continued for a further 30 minutes.

A stable 49% solids dispersion of methyl methacrylate and glycidyl methacrylate copolymer of molecular weight approximately 120,000 was obtained, in which the stabilizer associated with and was also covalently linked to the disperse polymer.

Derivative preparation 800.0 parts of the above polymer dispersion were placed in a reaction vessel fitted with mechanical stirrer and reflux condenser and heated to 105° C. The reaction vessel was purged with oxygen free nitrogen, the flow of nitrogen being continued throughout the entire reaction period.

The following mixture:

| | Parts |
|---|---|
| Methacrylic acid | 64.0 |
| Tall oil fatty acid (52% oleic, 46% linoleic, 1.3% rosin acids) | 15.68 |
| Aliphatic hydrocarbon (boiling range 140°–205° C., aromatics content 17%) | 140.0 |
| Ethylene glycol diacetate | 30.0 | was heated to 90° C. and added to the hot polymer dispersion. The temperature was increased to 115° C. and maintained for six hours. A stable dispersion of polymer derivative was formed.

When tested according to the cure test of Example 3, similar results relative to the control were obtained.

EXAMPLE 6

Preparation of a dispersion of a cross-linkable derivative of a poly(methyl methacrylate/glycidyl methacrylate), monomer ratio 95/5. The modified disperse polymer provided autoxidative groups capable of taking part in an autoxidation cross-linking reaction.

Dispersion preparation

A mixture of:

| | Parts |
|---|---|
| Stabilizer solution B (as in Example 5) | 8.0 |
| Aliphatic hydrocarbon (boiling range 92°–118° C., 10% aromatics) | 412.0 |
| Aliphatic hydrocarbon (boiling range 60°–90° C., 5% aromatics) | 200.0 |
| Glycidyl methacrylate | 1.61 |
| Methyl methacrylate | 30.8 |
| Azodiisobutyronitrile | 3.0 | was added to a reaction vessel fitted with a reflux condenser, heated to reflux and held at reflux for 20 minutes. A very fine cloud of disperse polymer formed.

The following mixture:

| | Parts |
|---|---|
| Stabilizer solution B | 138.0 |
| Methyl methacrylate | 665.0 |
| Glycidyl methacrylate | 35.0 |
| Azodiisobutyronitrile | 3.0 |
| Primary octyl mercaptan (10% solution in aliphatic hydrocarbon) | 10.0 | was then added at a uniform rate over a period of three hours to the refluxing contents of the reacting vessel in such a manner that the mixture feed was well diluted by the reflux return. Refluxing was continued for further 30 minutes. A stable 50% solids copolymer dispersion of methyl methacrylate and glycidyl methacrylate was obtained.

Derivative preparation 800.0 parts of the above polymer dispersion were placed in a reaction vessel fitted with mechanical stirrer and reflux condenser and heated to 105° C. The reaction vessel was purged with oxygen free nitrogen, the flow of nitrogen being continued throughout the entire reaction period.

The following mixture:

| | Parts |
|---|---|
| Aliphatic hydrocarbon (boiling range 140°–205° C., aromatics content 17%) | 90.0 |
| Tall oil fatty acid | 36.0 | was heated to 90° C. and added to the hot polymer dispersion. The temperature was increased to 115° C. and maintained for six hours. A stable dispersion of polymer derivative was formed.

EXAMPLE 7

Preparation of a dispersion of a cross-linkable derivative of a poly(styrene/methyl methacrylate/maleic anhydride), monomer ratio 50/20/30). The modified disperse polymer was capable of taking part in free radical initiated cross-linking reactions.

Stabilizer preparation 112.5 parts of acetone and 652.5 parts of n-butyl acetate were heated to reflux (approximately 90° C.) in a reaction vessel fitted with a stirrer, reflux condenser and two dropping funnels.

The following mixtures:

|  | Parts |
|---|---|
| (1) Acetone | 135.0 |
| Maleic anhydride | 147.0 |
| Azodiisobutyronitrile | 1.2 |
| (2) Styrene | 156.0 |
| Azodiisobutyronitrile | 1.2 | were added concurrently and at a uniform rate from separate dropping funnels to the refluxing liquids over a period of 2½ hours. The mixture was then held at reflux (approximately 80° C.) for a further two hours.

To a portion of the polymer solution prepared as above containing 35.0 parts of solid polymer was added 65.0 parts of a secondary fatty amine (chain length $C_{16}$–$C_{18}$), the mixture heated and solvent stripped off until a steady reflux state was reached at 130° C. and refluxing continued for three hours.

Dispersion preparation

The following mixture was added to a reaction vessel fitted with a stirrer, reflux condenser and two dropping funnels:

|  | Parts |
|---|---|
| Hydrocarbon liquid (boiling range 42°–148° C., aromatics content 9%) | 140.56 |
| Azodiisobutyronitrile | 0.12 | and heated to reflux (approximately 73° C.).
The following mixtures:

|  | Parts |
|---|---|
| (1) Hydroquinone | 0.04 |
| n-Octyl mercaptan (10% solution in hexane) | 2.29 |
| N,N-dimethyl formamide | 4.00 |
| Stabilizer (solids basis) solution as above | 35.88 |
| Styrene | 74.1 |
| Maleic anhydride | 51.3 |
| Methyl methacrylate | 35.5 |
| (2) Styrene | 14.5 |
| Azodiisobutyronitrile | 0.68 | were added concurrently and at a uniform rate over a period of two hours to the refluxing charge from separate dropping funnels. The mixture was held at reflux for a further 30 minutes when a further 35.88 parts (solids basis) of stabilizer was added.

Two further mixtures:

|  | Parts |
|---|---|
| (3) Styrene | 42.6 |
| Maleic anhydride | 26.62 |
| Hydroquinone | 0.02 |
| n-Octyl mercaptan (10% solution in hexane) | 6.88 |
| N,N-dimethyl formamide | 2.00 |
| (4) Methyl methacrylate | 17.75 |
| Azodiisobutyronitrile | 0.35 | were added concurrently and at a uniform rate over a period of one hour to the refluxing charge from separate dropping funnels. The mixture was held at reflux for a further 30 minutes, when 0.10 part of azodiisobutyronitrile were added and reflux continued for a further one hour. A stable 65.5% solids dispersion of a copolymer of molecular weight approximately 120,000 was obtained.

141.0 parts of hydrocarbon liquid (boiling range 42°–148° C. aromatics content 9%) were added to lower the solids to 50%.

Derivative preparation 800.0 parts of the above dispersion were placed in a reaction vessel fitted with mechanical stirrer and reflux condenser and heated to 105° C. The reaction vessel was purged with oxygen free nitrogen, the flow of nitrogen being continued throughout the entire reaction period.

The following mixture:

|  | Parts |
|---|---|
| β-Hydroxy ethyl acrylate | 112.5 |
| Hydroquinone | 0.1 |
| Aliphatic hydrocarbon (boiling range 140°–205° C., aromatics content 17%) | 140.0 | was heated to 90° C. and added to the hot polymer dispersion. The temperature was increased to 115° C. and maintained for six hours. A stable dispersion of polymer derivative was formed.

We claim:

1. In a process of preparing a stable dispersion of particles of an addition polymer in a substantially non-polar organc liquid in which the addition polymer is insoluble by preparing, by dispersion polymerization of α,β-ethylenically unsaturated monomer in an inert organic liquid in which the monomer is soluble and the resulting polymer is insoluble and in the presence of a stabilizer, a dispersion of insoluble polymer, said stabilizer being a stabilizer for particles of said insoluble polymer particles and comprising an anchoring component which becomes associated with the particles and a pendant chain-like component which is solvated by said organic liquid and provides a stabilizing sheath around the polymer particles;

the improvement which comprises using a stabilizer which is sufficient that it prevents gellation and coaguation when, to 132 parts of said dispersion at 50% by weight solids, there are added 90 parts by weight of a mixture of equal parts by weight of n-butyl benzyl phthalate, 2-ethoxy ethanol acetate and aliphatic hydrocarbon and the treated dispersion is stored in an oven at 45° C. for 48 hours, producing by said dispersion polymerization an addition polymer having a molecular weight of greater than 50,000 and containing on average at least one chemically reactive group per molecule, and including the step of reacting with the chemically reactive group of the disperse polymer so prepared a complementary chemically reactive group of a component which contains said complementary chemically reactive group and is selected from the group consisting of an autoxidative component containing a member of the group consisting of autoxidative paraffinic chains, dioxanes and vinyl dioxolanes and a component containing a double bond joining adjacent carbon atoms which will enter into free radical initiated addition reactions thereby attaching crosslinkable groups to the disperse polymer particles.

2. A process according to claim 1 in which the insoluble polymer has a molecular weight of greater than 100,000.

3. A process according to claim 1 in which the autoxidative component comprises an unsaturated paraffinic chain.

4. A process according to claim 3 in which the autoxidative entity is an unsaturated paraffinic chain derived from natural drying oils.

5. A process according to claim 4 in which the chain-like autoxidative entity is a chain of more than eight C—C links and the polymer comprises a maximum of 20% by weight of the chain-like entity.

6. A process according to claim 1 in which the unsaturated component comprises a dioxane of dioxolane.

7. A process according to claim 6 in which the cyclic autoxidative entity is a vinyl dioxolane or dioxane.

8. A process according to claim 1 in which the unsaturated component which will enter into free radical initiated addition reactions is a substituted ethylene comprising the ethylenic double bond and a complementary chemically reactive group.

9. A process according to claim 8 in which the unsaturated component is at least one member selected from the group consisting of acrylic acid, methacrylic acid, glycidyl methacrylate and glycidyl acrylate.

10. A process according to claim 1 in which the unsaturated component which will enter into free radical initiated addition reactions is at least one member selected from the group consisting of allyl alcohol, glycerol mono-allyl ether, glycerol di-allyl ether and cinnamic acid.

11. In a stable dispersion of particles of addition polymer having a molecular weight of greater than 50,000 in a substantially non-polar organic liquid in which the polymer is insoluble, the improvement wherein the said polymer is cross-linkable by having attached thereto at least one component selected from the group consisting of an autoxidative component selected from the group consisting of autoxidative paraffinic chains, dioxanes and vinyl dioxolanes and a component containing a double bond joining adjacent carbon atoms which will enter into a free radical initiated addition reaction.

12. A stable dispersion according to claim 11 in which the addition polymer has a molecular weight of greater than 100,000.

13. A stable dispersion according to claim 11 in which the chain-like autoxidative entity is a chain of more than eight C—C links and the polymer comprises a maximum of 20% by weight of the chain-like entity.

14. As a particulate solid a cross-linkable addition polymer when prepared by the process of claim 1 and subsequently dried.

References Cited
UNITED STATES PATENTS

| | | | |
|---|---|---|---|
| 3,095,388 | 6/1963 | Osmond et al. | 260—33.6 |
| 3,218,287 | 11/1965 | Schmidle et al. | 260—33.6 |
| 3,232,903 | 2/1966 | Schmidle et al. | 260—33.6 |
| 3,255,135 | 6/1966 | Schmidle et al. | 260—23 |
| 3,264,234 | 8/1966 | Osmond | 260—22 |
| 3,317,635 | 5/1967 | Osmond | 260—23 |
| 3,399,163 | 8/1968 | Cousens et al. | 260—33.6 |
| 3,405,087 | 10/1968 | Fryd | 260—33.6 |
| 3,419,515 | 12/1968 | Schmidle et al. | 260—33.6 |
| 3,433,753 | 3/1969 | Farkas et al. | 260—22 |

DONALD E. CZAJA, Primary Examiner

R. W. GRIFFIN, Assistant Examiner

U.S. Cl. X.R.

117—124 E, 161 UC, 161 UB; 260—23 AR, 30.4 R, 33.6 UA, 875, 885